(12) United States Patent
Beardsell et al.

(10) Patent No.: US 7,958,048 B2
(45) Date of Patent: Jun. 7, 2011

(54) METHOD AND APPARATUS FOR PREDICTING OUTCOMES OF A HOME EQUITY LINE OF CREDIT

(75) Inventors: Mark Beardsell, Wildwood, MO (US); Harlow Burgess, San Francisco, CA (US); Paul Calem, Gaithersburg, MD (US)

(73) Assignee: CoreLogic Information Solutions, Inc., Santa Ana, CA (US)

( * ) Notice: Subject to any disclaimer, the term of this patent is extended or adjusted under 35 U.S.C. 154(b) by 0 days.

(21) Appl. No.: 11/772,545

(22) Filed: Jul. 2, 2007

(65) Prior Publication Data
US 2008/0010188 A1 Jan. 10, 2008

Related U.S. Application Data

(60) Provisional application No. 60/817,845, filed on Jun. 30, 2006.

(51) Int. Cl.
*G06Q 40/00* (2006.01)
(52) U.S. Cl. ............... 705/38; 705/10; 705/35; 705/36; 705/3
(58) Field of Classification Search .............. 705/35–36, 705/38, 10; 703/3
See application file for complete search history.

(56) References Cited

U.S. PATENT DOCUMENTS

| | | | |
|---|---|---|---|
| 5,884,287 A | 3/1999 | Edesess | |
| 6,249,775 B1 | 6/2001 | Freeman et al. | |
| 7,003,491 B2 | 2/2006 | Starkman | |
| 7,451,065 B2 * | 11/2008 | Pednault et al. | ................... 703/2 |
| 7,801,789 B1 * | 9/2010 | Cohler et al. | ............... 705/36 R |
| 2001/0032158 A1 | 10/2001 | Starkman | |
| 2002/0035530 A1 | 3/2002 | Ervolini et al. | |
| 2002/0123960 A1 | 9/2002 | Ericksen | |
| 2003/0078878 A1 | 4/2003 | Opsahl-Ong | |
| 2003/0110122 A1 | 6/2003 | Nalebuff et al. | |
| 2003/0149656 A1 | 8/2003 | Magruder et al. | |
| 2003/0149659 A1 | 8/2003 | Danaher et al. | |
| 2004/0030649 A1 | 2/2004 | Nelson et al. | |

(Continued)

FOREIGN PATENT DOCUMENTS

JP 2004326329 11/2004

OTHER PUBLICATIONS

Monte Carlo Method, Wikipedia, the free encyclopedia (Lat Updated Jun. 28, 2010).*

*Primary Examiner* — Harish T Dass
(74) *Attorney, Agent, or Firm* — Snell & Wilmer L.L.P.

(57) ABSTRACT

A method and apparatus are described where account information is used to predict possible outcomes of a HELOC. To predict the possible outcomes, HELOC account state transition probabilities are modeled. The transition probabilities, determined by historic data regression analysis, provide the framework for a Monte Carlo simulation. The simulation is seeded with HELOC account information. A calculation engine takes the account information and simulates an elapse of time using a random number generator and the state transition probabilities. The simulation results in updated account information predicting a possible outcome over the elapsed time interval. The updated account information in turn may be used by the calculation engine to simulate the next elapse of time. This method may be iteratively repeated with the account information propagated forward until the end of the prediction period is reached.

15 Claims, 8 Drawing Sheets

U.S. PATENT DOCUMENTS

| | | |
|---|---|---|
| 2004/0107161 A1* | 6/2004 | Tanaka et al. .................. 705/38 |
| 2004/0153330 A1 | 8/2004 | Miller et al. |
| 2005/0010509 A1 | 1/2005 | Straub |
| 2005/0262013 A1 | 11/2005 | Guthner et al. |
| 2005/0273430 A1 | 12/2005 | Pliha |
| 2006/0059073 A1 | 3/2006 | Walzak |
| 2006/0085325 A1 | 4/2006 | Jammal et al. |
| 2006/0195391 A1 | 8/2006 | Stanelle |
| 2006/0224499 A1 | 10/2006 | Graboske et al. |
| 2006/0242047 A1 | 10/2006 | Haggerty et al. |
| 2006/0271472 A1 | 11/2006 | Cagan |
| 2006/0287947 A1 | 12/2006 | Toms |
| 2007/0038558 A1 | 2/2007 | Nakatsugawa et al. |
| 2007/0043654 A1 | 2/2007 | Libman |
| 2007/0244777 A1* | 10/2007 | Torre et al. ...................... 705/35 |
| 2007/0288357 A1* | 12/2007 | Holman et al. .................. 705/38 |

* cited by examiner

METHOD AND APPARATUS FOR PREDICTING OUTCOMES OF A HOME EQUITY LINE OF CREDIT

CLAIM OF PRIORITY UNDER 35 U.S.C. §119

The present Application for Patent claims priority to Provisional Application No. 60/817,845, entitled "Method and Apparatus for Predicting Outcomes of a Home Equity Line of Credit," filed on Jun. 30, 2006, and assigned to the assignee hereof and hereby expressly incorporated by reference herein.

BACKGROUND

1. Field

The present invention relates to home equity lines of credit (HELOC) and more particularly to a method and apparatus for generating outcome predictions for a HELOC.

2. Related Art

In the mortgage industry, the decision-making process of whether or not to grant a HELOC to a borrower may depend on a number of factors such as the borrower's income, amount of equity in the home, etc. Banks and lending institutions must ensure that the primary mortgage in combination with the HELOC do not provide an unacceptably high risk that the loans will be defaulted on. Current methods for measuring this risk involve ineffective, unsubstantiated, paper review programs that fail to produce meaningful assessments for lenders and purchasers of loans. Thus, there is a need for a cost-effective and accurate method for quantifying risk associated with a HELOC.

SUMMARY

According to the present invention, a method and apparatus are described where account information is used to predict possible outcomes of a HELOC. To predict the possible outcomes, HELOC account state transition probabilities are modeled. The transition probabilities, determined by historic data regression analysis, provide the framework for a Monte Carlo simulation. The simulation is seeded with HELOC account information. A calculation engine takes the account information and simulates an elapse of time using a random number generator and the state transition probabilities. The simulation results in updated account information predicting a possible outcome over the elapsed time interval. The updated account information in turn may be used by the calculation engine to simulate the next elapse of time. This method may be iteratively repeated with the account information propagated forward until the end of the prediction period is reached. The account information generated represents a possible outcome of the HELOC account over the prediction period. The simulation process may be repeated many times using the identical account information seed generating an ensemble of possible account outcomes. The ensemble may be aggregated to generate statistics of significant HELOC events such as default, delinquency, payment and draw.

In one embodiment, the present invention provides a machine-readable medium having instructions for predicting outcomes of a home equity line of credit loan. The instructions upon execution cause a machine to receive a plurality of account characteristics for a home equity line of credit loan, generate an initial account state vector from the plurality of account characteristics, receive a simulation parameter, update the initial account state vector by propagating a state vector forward using a statistical transition model, predict draw or payment events using the statistical transition model, and generate probability distributions and compute account statistics using the statistical transition model.

In one embodiment, the present invention provides a computer-based method for forecasting possible outcomes of a home equity line of credit (HELOC). The method includes generating a HELOC account simulation model having a plurality of possible account states, receiving account information for seeding a simulation, simulating an outcome by seeding the simulation with account information and iteratively predicting a next account state from the plurality of possible account states using the HELOC account simulation model, generating an ensemble of simulated outcomes, and aggregating the outcome ensemble into one or more probability statistics.

In one embodiment, the present invention provides a method for estimating the expected return from a home equity line of credit (HELOC) account. The method includes generating a statistical model from historic HELOC data, receiving account information about a prospective HELOC, comparing the account information with the statistical model, and predicting loan balance statistics from the comparison.

In one embodiment, the present invention provides a method for calculating the utilization statistics of a home equity line of credit (HELOC) using Monte Carlo methods. The method includes generating a statistical transition model of possible HELOC account states, receiving HELOC account data, simulating a plurality of possible account outcomes by seeding the statistical transition model with HELOC account data, and generating one or more probability statistics from the plurality of possible account outcomes.

BRIEF DESCRIPTION OF THE DRAWINGS

The features, objects, and advantages of the present invention will become more apparent from the detailed description set forth below when taken in conjunction with the drawings, wherein.

DETAILED DESCRIPTION

Methods and systems that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

The present invention provides a method and apparatus for predicting outcomes of a HELOC. The outcome predictions provide a useful risk management tool for HELOC lenders. Lenders can use the tool to evaluate a loan, a loan portfolio or perform a sensitivity analysis. A sensitivity analysis allows an institution to determine potential risks associated with exogenous events. For example an institution may want to see how their risk exposure changes with a one percent increase in the prime rate.

HELOC loans have become increasingly popular with homeowners and lending institutions. Lenders favor the loans because they allow the lender to extend credit to a homeowner while minimizing default risk by securing the loan with a lien against the homeowner's home. Homeowner's favor the loans because they allow a homeowner to tap the equity in their home as needed to provide for unforeseen expenses. Tax deductibility of qualifying HELOC loans makes the loans even more attractive to homeowners.

Before a lender makes any loan, the lender performs a risk analysis. The risk analysis usually includes gathering information for the prospective loan account. The information includes credit worthiness indicators such as the borrower's FICO credit score, the value of collateral and existing liens against the borrower, etc. The information provides the lender with key ratios such as the combined loan-to-value ratio (CLTV) which lenders use to determine the creditworthiness of a potential borrower. The information in the prospective loan account is also compared with historical data to evaluate the risk of default, delinquency and prepayment. If the lender determines that these risks are small and manageable relative to the potential profit, the lender will make the loan.

HELOCs have attributes that make risk analysis even more complex. For example, the lender does not know how extensively the homeowner will use the line of credit or what the outstanding balances will be. For example, one homeowner may use the HELOC exclusively for rare emergencies infrequently drawing small amounts money and paying off the balance as soon as possible. Another homeowner may use the HELOC loan to fund a college education steadily drawing funds for four years maxing out (completely utilizing) the HELOC and slowly repaying the loan in consistent steady payments over fifteen years. The potential profits and risks associated with each of these HELOCs are very different. The remarkable differences in loan balances and loan utilization makes the HELOC risk analysis much more complex than other home loans. From this example, a good HELOC risk analysis should include not only evaluating the probability of default, delinquency and prepayment but should also include a good prediction of the homeowner's payment and draw behavior over time.

A method and apparatus that predicts payment and draw information as well as default, delinquency, prepayment probabilities is an invaluable risk management tool. Using these types of tools, institutions can more precisely quantify their risk exposure and determine from which accounts a HELOC would be most profitable. The tools also allow institutions to predict the effect of exogenous events (such as an interest rate increase) on individual HELOCs and any resulting change in the institutions risk exposure. The tools can be used by an institution to periodically evaluate its HELOC portfolio and terminate HELOC accounts where the expected return on the account is no longer attractive.

HELOC outcome forecasting may further provide securitization of the HELOC market. Traditionally, institutions were reluctant to purchase delinquent accounts. However, the number of accounts that have some delinquency over the prior year is substantial and in recent years some institutions have begun to tolerate some delinquent activity. A tool that accurately predicts future payments and default probabilities would allow more accurate quantification of risk and more appropriate pricing of HELOC accounts in secondary markets.

Figure 1:
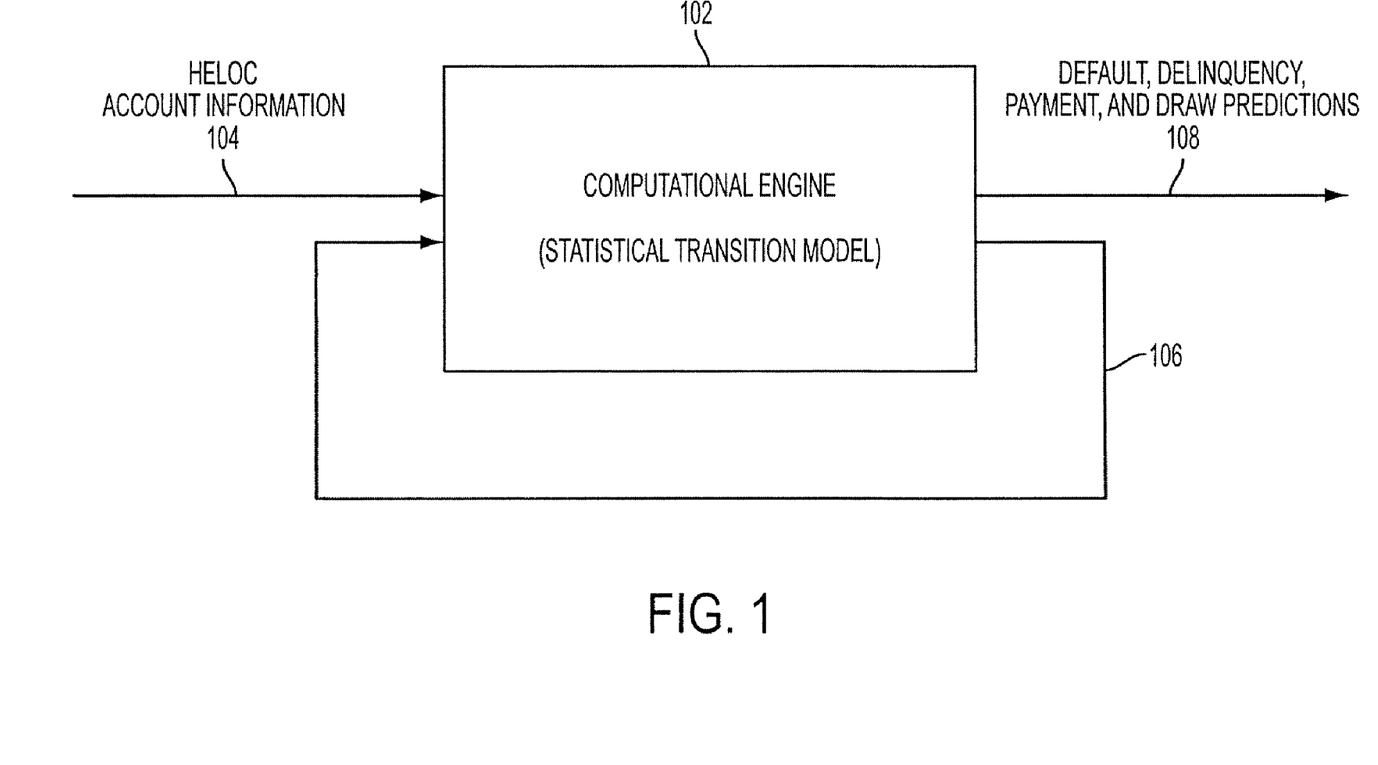
FIG. 1 is a block diagram of a system having a computational engine according to an embodiment of the present invention.

FIG. 1 is a block diagram of a system 100 having a computational engine 102. The computational engine 102 may be a computing platform or a computer capable of performing mathematical operations, storing numbers and arrays, and generating random numbers. The computing platform simulates possible outcomes of a HELOC using a Monte Carlo methodology. The HELOC account information 104 may be fed into the computational engine 102. The computational engine 102 may parse the account information 104 storing the data as needed for a HELOC statistical model (explained herein). The computational engine 102 may generate an initial account state vector from the account information 104. An account state vector may include dynamic account information such as the loan balance, CLTV ratio, interest rates, home price and previous delinquencies that is used by the statistical transition model to determine the probability of state transition. The initial account state vector may be used as a seed to simulate theoretical outcomes of the HELOC account. The results of numerous simulations are aggregated to determine HELOC outcome probabilities.

To generate a simulation, the computational engine 102 may propagate forward the state vector. Propagating the state vector simulates the effect of time on a HELOC. To propagate the state vector forward, a statistical transition model and a random number generator may be used. The statistical transition model may include the theoretical probabilities of an event occurring over a specified time interval. The computational engine 102 may use a random number generator to simulate the effect of a lapse of time on the account and may update the account state vector accordingly. For example, if the historic data indicate that there is 0.1% chance that an account with similar characteristics will default in the time interval, the computational engine 102 may generate a random number. If the random number generator generates a number that is in a predetermined interval that has a 0.1% chance of occurring, the computational engine 102 may update the account state vector to indicate a default. The computational engine 102 may repeat this process for each of the state variables in the account state vector generating a new account state vector that represents the account state propagated forward in time. The newly generated account state vector may be stored in a memory and may be fed back via a feedback loop 106 into the computational engine 102 where the account state vector is again propagated forward using the statistical transition model. This process may be repeated until the end of the prediction period is reached.

The computational engine 102 may rely on the statistical model to propagate the account state vector. The statistical model may include state transition equations or matrices whose coefficients are derived from historic HELOC data. The coefficients can be updated periodically to improve or refine the model by mining historic HELOC data and performing a regression analysis. The account state transition probabilities (explained hereinafter) can be mutually exclusive and binary and can be determined using logistic regression analysis.

The computational engine 102 may run multiple simulations using the initial account state vector to generate an ensemble of outcomes. The ensemble of outcomes may be aggregated to generate cumulative probability distribution curves and related statistical information. The curves and statistics are outputs 108 providing insight into the probabilities and timing of significant HELOC events such as default and delinquency. The computational engine 102 also outputs expected values, variances, and other probability information for loan payments and draws.

Figure 2:
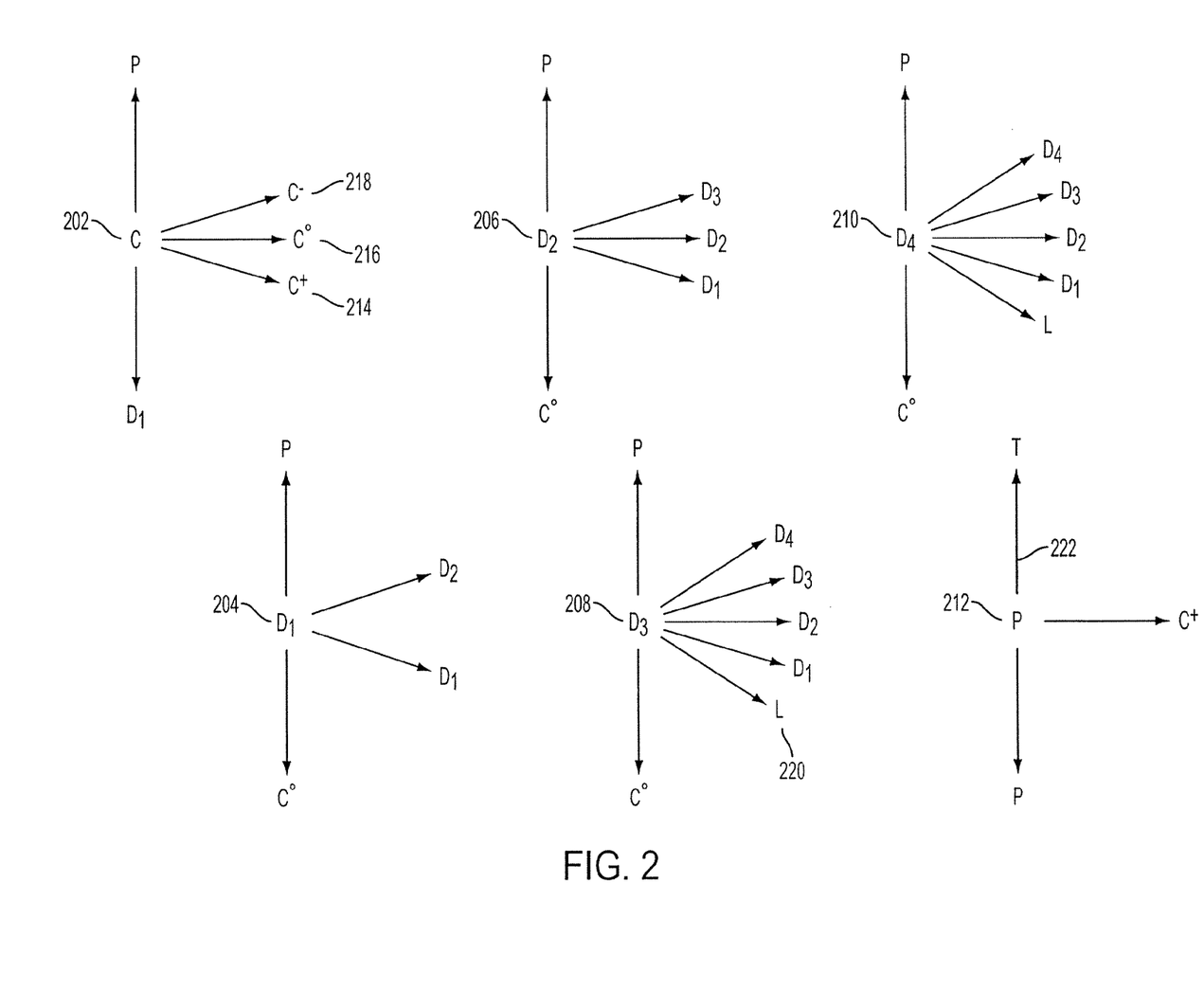
FIG. 2 is a state transition diagram of a statistical transition model used by the computational engine of FIG. 1 according to an embodiment of the present invention.

FIG. 2 shows a state transition diagram of a statistical transition model used by the computational engine 102 to propagate the account state vector forward. The state transition diagram may have six primary states. The first state C 202 may represent an account that is current. The second state D1 204 may represent an account for which a payment is 30-59 days delinquent. The third state D2 206 may represent an account for which a payment is 60-89 days delinquent. The fourth state D3 208 may represent an account that is 90-119 days delinquent. The fifth state D4 210 may represent an account that is 120-179 days delinquent. The sixth state P 212 may represent an account with no balance. In one embodiment, the account states are mutually exclusive. That is, an account must be in one and only one state at any given time.

An account in state C 202 may transition to state P 212 simulating the event that a homeowner paid off the complete loan balance. An account in state C 202 may also transition to state D1 204 simulating the event that the homeowner is 30-59 days delinquent. An account in state C 202 may also remain in state C 202 simulating the event that the owner has been making appropriate and timely loan payments. Three other possible events may occur with an account in state C 202. First, the homeowner may make a draw, $C^+$ 214, on the account increasing the outstanding balance. The draw causes an increase in the utilization of the HELOC. Second, the homeowner may make only the required timely payment, $C^0$ 216, with only a small change in the outstanding balance. The payment results in only a small change for the utilization of the HELOC. Third, the homeowner may make a partially payoff, $C^-$ 218, reducing the outstanding balance. The payment results in a decrease in the utilization of the HELOC.

An account in state D1 204 may remain in state D1 204 simulating the event that the loan is still 30-59 days delinquent. The account may also transition to state D2 simulating the event that the loan is now 60-89 days delinquent. The account may transition to state P 212 simulating the event that the homeowner has paid off the entire loan balance. The account may also transition to state C 202 simulating the account owner has made a large enough payment to cover all outstanding payments due.

An account in state D2 206 may remain in state D2 206 simulating the event that the loan is still 60-89 days delinquent. The account may also transition to state D3 208 simulating the event that the loan is now 90-119 days delinquent. The account may transition to state P 212 simulating the event that the homeowner has paid off the entire loan balance. The account may also transition to state D1 204 simulating the event that the homeowner has made a payment to cover the portion of the loan that is 60-89 days delinquent but has not paid enough to cover the portion of the loan that is 30-59 days delinquent. The account may also transition to state C 202 simulating the account owner has made a large enough payment to cover all outstanding payments due.

An account in state D3 208 may remain in state D3 208 simulating the event that the loan is still 90-119 days delinquent. The account may also transition to state D4 simulating the event that the loan is now 120-179 days delinquent. The account may transition to state P 212 simulating the event that the homeowner has paid off the entire loan balance. The account may also transition to state D2 206 simulating the event that the homeowner has made a payment to cover the portion of the loan that is 90-119 days delinquent but has not paid enough to cover the portion of the loan that is 60-89 days delinquent. The account may also transition to state D1 204 simulating the event that the homeowner has made a payment to cover the portion of the loan that is 90-119 days delinquent and any portion that is 60-89 days delinquent but has not paid enough to cover the portion of the loan that is 30-59 days delinquent. The account may also transition to state C 202 simulating the event that the homeowner has made a large enough payment to cover all outstanding payments due. The account may also transition to a charge off state L 220 indicating the lending institution does not expect repayment or has sold the debt to a collection agency.

An account in state D4 210 may remain in state D4 210 simulating the event that the loan is still 120-179 days delinquent. The account may transition to state P 212 simulating the event that the homeowner has paid off the entire loan balance. The account may also transition to state D3 208 simulating the event that the homeowner has made a payment to cover the portion of the loan that is delinquent 120-179 days late but has not paid enough to cover the portion of the loan that is 90-119 days delinquent. The account may also transition to D2 206 simulating the event that the homeowner has made a payment to cover the portion of the loan that is delinquent 120-179 days and any portion that is delinquent 90-119 days but has not paid enough to cover the portion of the loan that is 60-89 days delinquent. The account may also transition to state D1 204 simulating the event that the homeowner has made a payment to cover the portion of the loan that is delinquent 120-179 days, any portion that is delinquent 90-119 and any portion that is delinquent 60-89 days but has not paid enough to cover the portion of the loan that is 30 to 59 days delinquent. The account may also transition to state C 202 simulating that the homeowner has made a large enough payment to cover all outstanding payments due. The account may also transition to a charge off state L 220.

An account in state P 212 may remain in state P 212 simulating the event that the HELOC is unused or currently paid off. The account may transition to state C 202 simulating an event that a customer draws on the HELOC. The account may also transition to state T 222 which simulates the event that the customer or the loan institution terminates the HELOC. It should be noted that an ongoing state P 212 is a unique line of credit loans. There is no loan but credit is available.

A charge off model independent of the state transition model may predict loss on an account given default. The model allows the calculation engine 102 to compute the magnitude of risk exposure over the prediction period.

The state transitions form the framework for propagation of the account state vector. The account state vector may be propagated forward in time using a random walk with the frame change probabilities based on the statistical transition model. The statistical transition model may include equations or equation coefficients generated from historic HELOC data.

The computational engine 102 uses the statistical transition model to propagate the account state vector forward, prediction interval by prediction interval, in a Markov process generating account information at each prediction interval in the prediction period. The resulting series of account state vectors generated represents a snapshot of the account information of a single hypothetical account outcome at each time interval over the prediction period.

The computational engine 102 can repeat the propagation process many times (preferably thousands) generating numerous hypothetical account outcomes from the same initial account information. The ensemble of state vector series can be aggregated to estimate the probability distribution of outcomes for the account.

Figure 3:
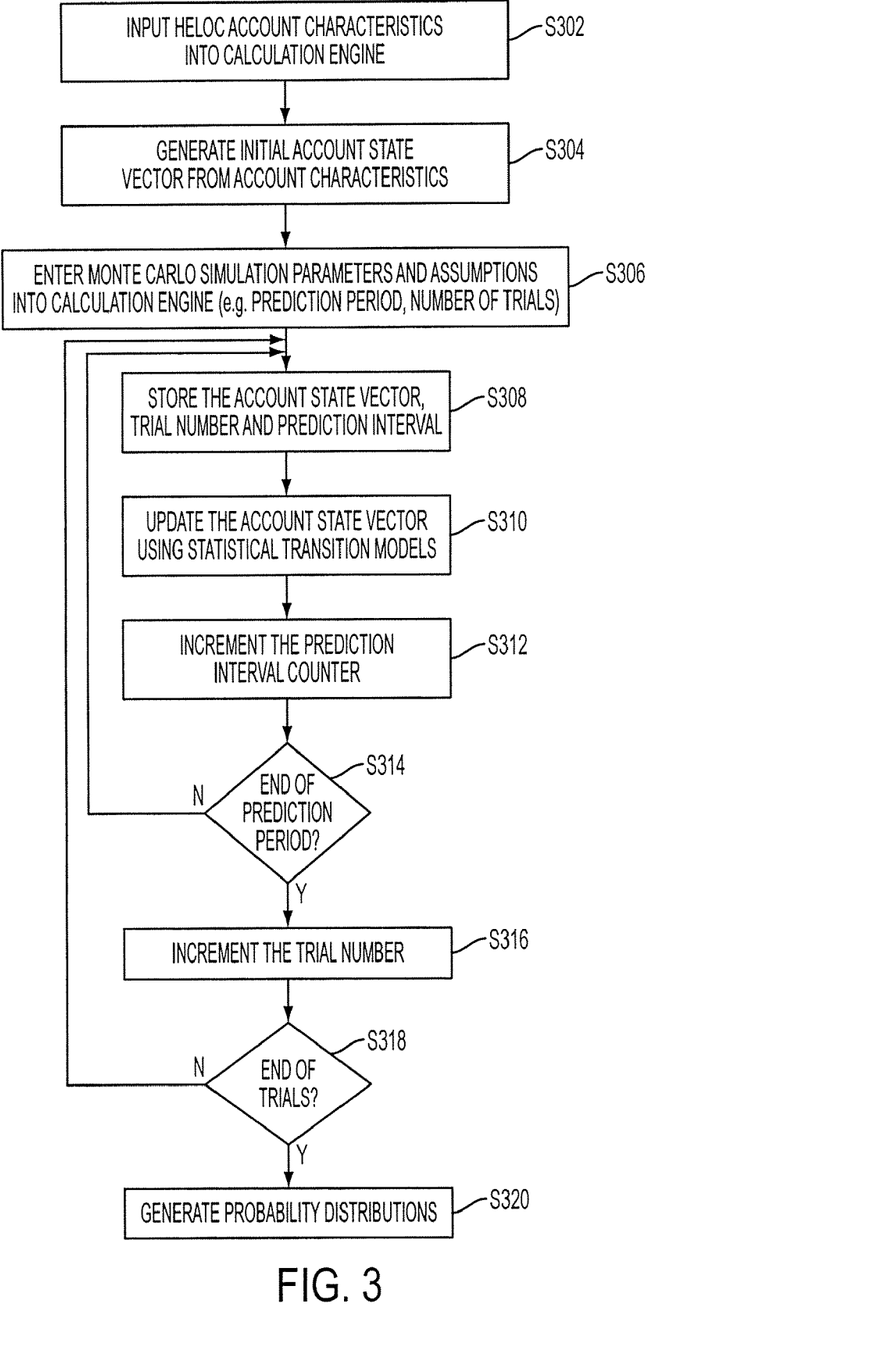
FIG. 3 is a flow diagram showing a method for predicting outcomes of a HELOC loan according to an embodiment of the present invention.

FIG. 3 is a flow diagram showing a method for predicting outcomes (e.g., determining the outcome probability distribution) of a HELOC loan. First, account characteristics of a HELOC account are input into or received by the computational engine 102 (S 302). The account characteristics include data used by the computational engine 102 to forecast default, delinquency, payments and draws. In various embodiments, the account characteristics may include location of the home (e.g. California), loan origination date, property value, occupancy (e.g. owner), junior ratio (limit/value), utilization at origination, balance at origination, term, back end ratio, prediction start date, index rate, margin, interest rates and home price index.

The computational engine 102 may generate an initial account state vector from the account characteristics (S 304). The state vector may include all information that is needed for the computational engine 102 to determine the probabilities of each state transition shown in FIG. 2. For example, the utilization rate may be a quantitative indicator of the probability of state transition. A homeowner who has maxed out (full utilization) his HELOC is more likely to default than a homeowner who has only utilized 10% of available credit. The initial state vector also has place holders for other quantitative indicators of the probability of state transition that may be acquired during the prediction period (e.g., a loan payment delinquency). An account that has numerous payment delinquencies is more likely to default than an account with no payment delinquencies.

Next, simulation parameters and assumptions are entered into or received by the computational engine 102 (S 306). For example, the loan prediction period, the prediction interval and the number of Monte Carlo trials can be entered or defaults accepted. For example, the user may want a very precise estimate of the month to month account outcome probabilities over the next five years. The user may choose a one month prediction interval, a five year prediction interval, and a robust number of trials, for example 10,000.

The computational engine 102 may store the account state vector, the trial number and the prediction interval (S 308). If the computational engine 102 has no account state vector, trial number and prediction interval, the computational engine 102 stores the initial account state vector as the account state vector, a one for the trial number and a zero for the prediction interval.

The computational engine 102 updates the account state vector by propagating the state vector forward using the statistical transition models (S-310). The account state vector may propagate according to the state transition diagram in FIG. 2. The statistical transition models may contain the equations and coefficients necessary to determine the transition probabilities based on the information in the account state vector. If the current state vector is in state C, the computational engine 102 may use the statistical transition model to predict draw or payment events. A draw or payment may or may not be made. If a draw or payment is made, the statistical transition model may predict the size of the draw or payment.

The computational engine 102 may increment the prediction interval counter (S 312). The prediction interval counter may be used by the calculation engine 102 to track which prediction interval the updated account state vector corresponds with. The computational engine 102 may test to see if the prediction interval corresponds with the end of the prediction period (S 314). If it does not, the computational engine 102 may return to S 308 to propagate the account state vector forward over the next interval. If the interval is the end of the prediction period, the computational engine 102 may increment the trial number (S 316).

The computational engine 102 may check to see if the trial number corresponds with the number of trials. If it does not, the computational engine 102 may save the initial account state vector as the account state vector and return to S 308 to begin a new account simulation trial. If the trial number corresponds with the final trial, a complete ensemble of account simulations has been generated with each account simulation in the ensemble having the same initial account information.

The computational engine 102 may generate probability distributions and compute account statistics using the statistical transition models (S 320). The probability distributions and the account statistics may be presented to the user in a number of formats.

Figure 4:
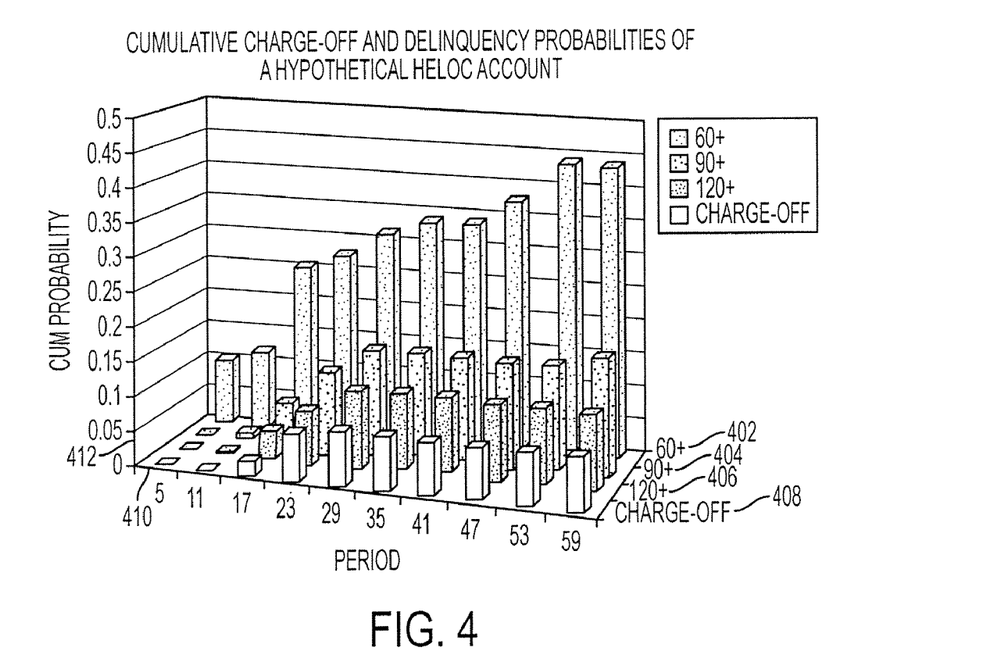
FIG. 4 shows the predicted cumulative charge off and delinquency probabilities of an exemplary HELOC account according to an embodiment of the present invention.

FIGS. 4-12 show exemplary outputs 108 of the computational engine 102 of FIG. 1 or the method of FIG. 3. FIG. 4 shows the cumulative probability distribution function of the 60 day 402, 90 day 404, and 120 day 406 delinquencies and charge off 408 probabilities over a 60-month prediction period for an exemplary HELOC account. The X axis 410 shows discrete time intervals of the time period and the Y axis 412 shows the cumulative probabilities. Notably, the 60 day 402, 90 day 404 and 120 day 406 delinquencies and charge off 408 probabilities correspond respectively with state transitions to state D2 206, state D3 208, state D4 210 and state L 220 of the state transition model shown in FIG. 2. The cumulative delinquency probabilities monotonically increase until the end of the prediction period. The 60 day 402 delinquency probabilities are larger than the 90 day 404 delinquency probabilities which are larger than the 120 day 406 delinquency probabilities which are larger than the charge off delinquency probabilities.

Figure 5:
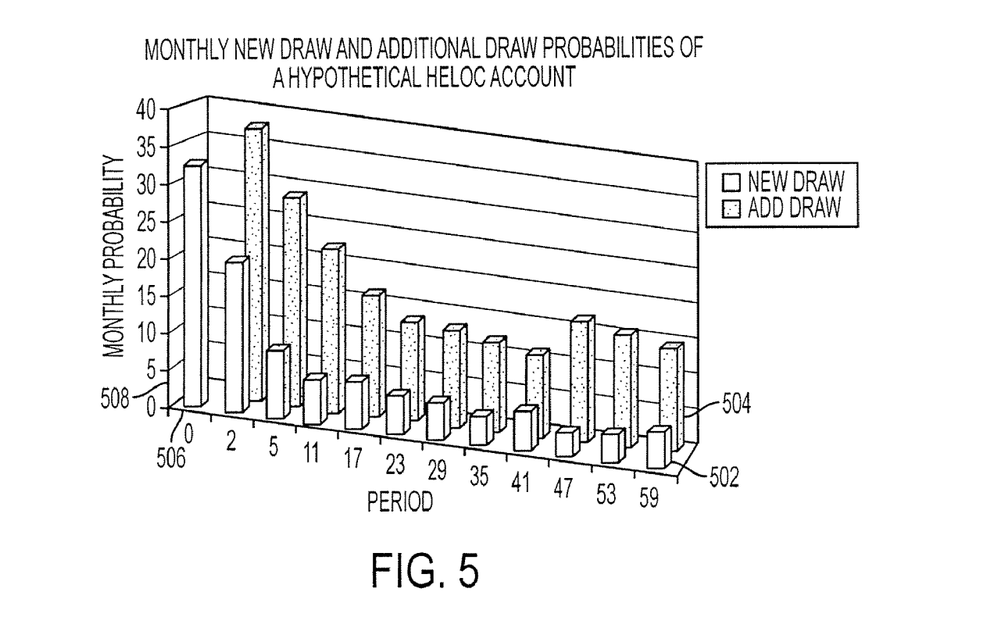
FIG. 5 shows the predicted monthly new draw and additional draw probabilities of an exemplary HELOC account according to an embodiment of the present invention.

FIG. 5 shows the probability of a new draw 502 or an additional draw 504 from an exemplary HELOC account over a 60-month prediction period. In contrast with FIG. 4, the probabilities are presented as probability densities and not as a cumulative distribution function. The X axis 506 shows discrete time intervals of the time period and the Y axis 508 shows the monthly probabilities. The probability of a new draw is highest at the time the HELOC account is opened. The need for a draw may have been the motivation for opening the account. Additional draws are also most common near the time the HELOC account is opened. One factor possibly motivating a homeowner to open a line of credit is that the homeowner is unsure of his prospective borrowing needs. Both the new draw and additional draw amounts probabilities appear to stabilize after a year. The homeowners borrowing needs one to five years after loan origination are likely to be largely random.

Figure 6:
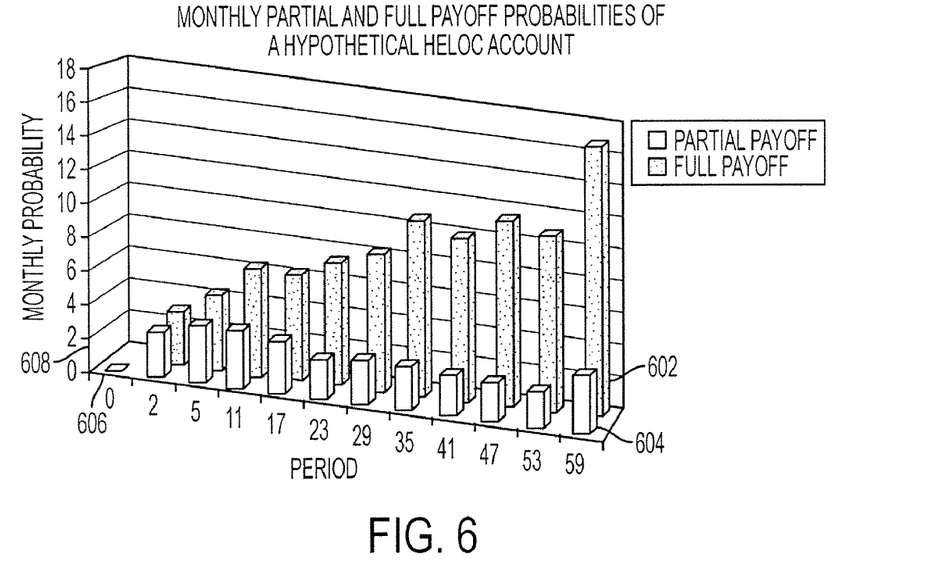
FIG. 6 shows the predicted monthly partial and full payoff probabilities of an exemplary HELOC account according to an embodiment of the present invention.

FIG. 6 shows the monthly full payoff 602 and partial payoff probabilities 604 of an exemplary HELOC account. The X axis 604 shows discrete time intervals of the time period and the Y axis 608 shows the monthly probabilities. The prediction curves on this plot are not intuitive making the outcome probabilities more informative. In this case, the outcome probabilities provides a lending institution valuable information about the probability that HELOC loan will be paid off or partially paid off, ending or decreasing a profit stream.

Figure 7:
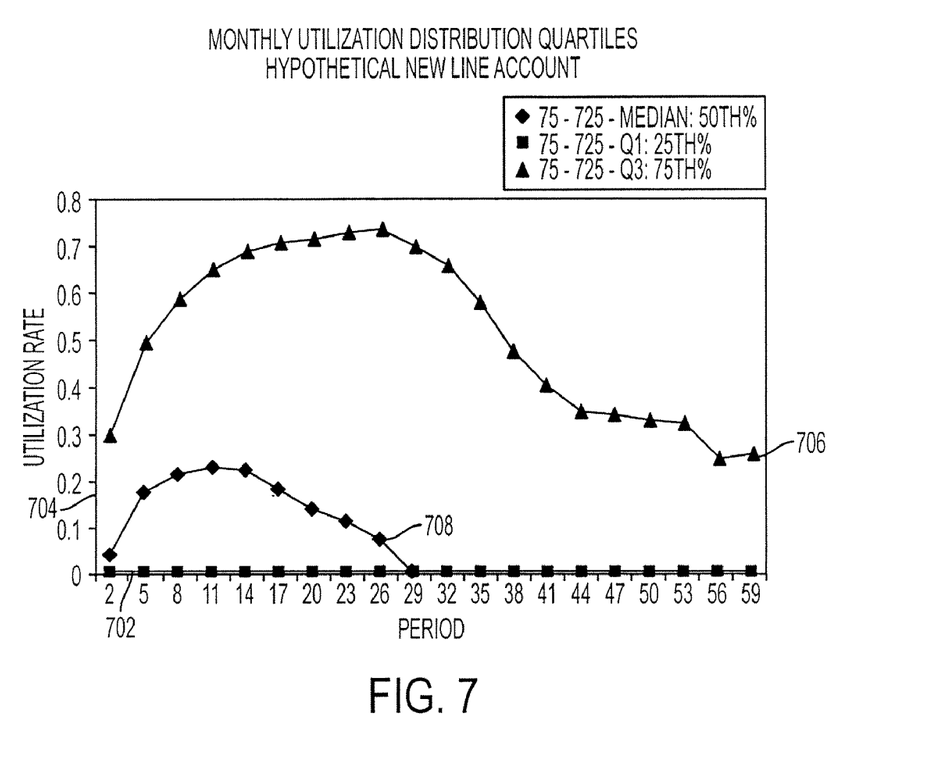
FIG. 7 shows the predicted monthly utilization distribution quartiles of an exemplary HELOC account according to an embodiment of the present invention.

FIG. 7 shows the monthly utilization distribution quartiles of a hypothetical HELOC account. The X axis 702 shows discrete time intervals of the time period and the Y axis 704 shows the utilization rate. This plot provides a lending institute with important HELOC information. The utilization rate determines the outstanding HELOC balance and thus the revenue stream from the loan. The upper quartile shows $75^{th}$ percentile probability of HELOC utilization while the lower quartile shows the $25^{th}$ percentile probability of HELOC utilization.

Figure 8:
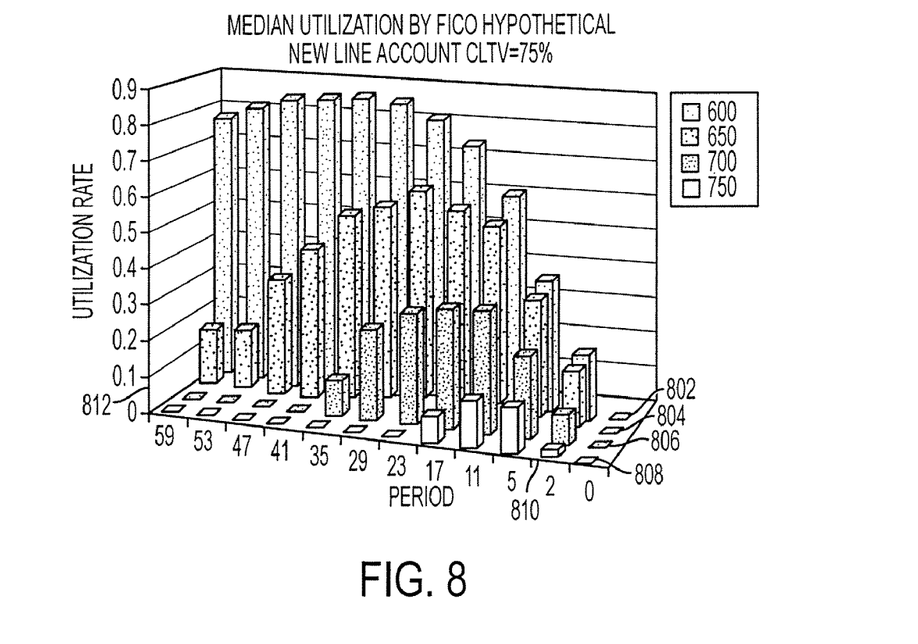
FIG. 8 shows the predicted median monthly utilization probabilities of an exemplary HELOC account with a CLTV of 75% by FICO score according to an embodiment of the present invention.
Figure 9:
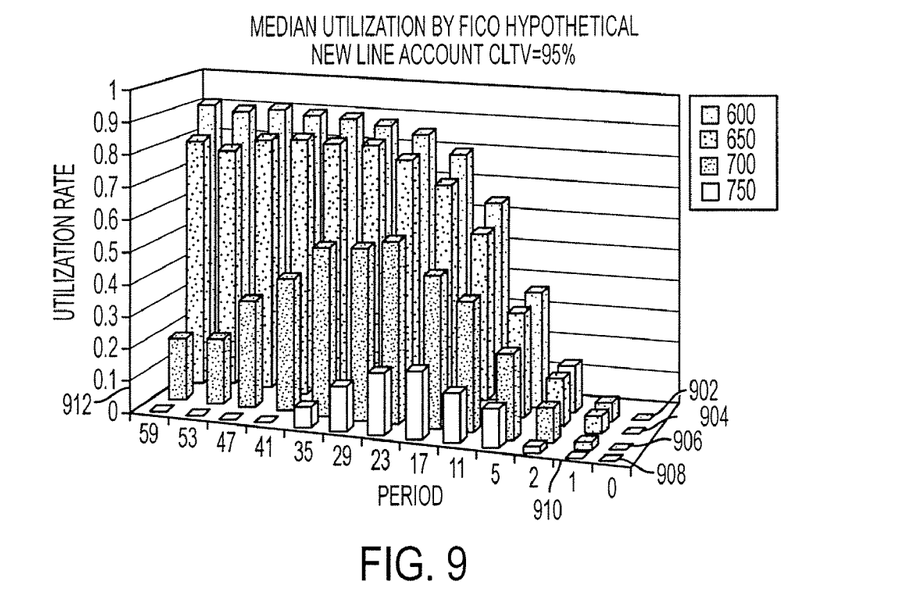
FIG. 9 shows the predicted median monthly utilization probabilities of an exemplary HELOC account with a CLTV of 95% by FICO score according to an embodiment of the present invention.

FIGS. 8-9 together show the effects of two variables on account utilization, namely FICO scores and CLTV. In FIG. 8, the CLTV ratio is held fixed at 75% and the utilization rates for a 600 FICO score 802, a 650 FICO score 804, a 700 FICO score 806 and a 750 FICO score 808 are shown over the 60-month prediction period. In FIG. 9, the CLTV ratio is held fixed at 95% and the utilization rates for a 600 FICO score 902, a 650 FICO score 904, a 700 FICO score 906 and a 750 FICO score 908 are shown over the 60-month prediction period. The X axes 810, 910 show discrete time intervals of the time period and the Y axes 812, 912 show the utilization rate. The plots provide insight into the effect of FICO score on a utilization rate for a fixed CLTV and the effect of CLTV on utilization rate for a fixed FICO score. Notably, CLTV and FICO score are two of the best indicators of creditworthiness.

Figure 10:
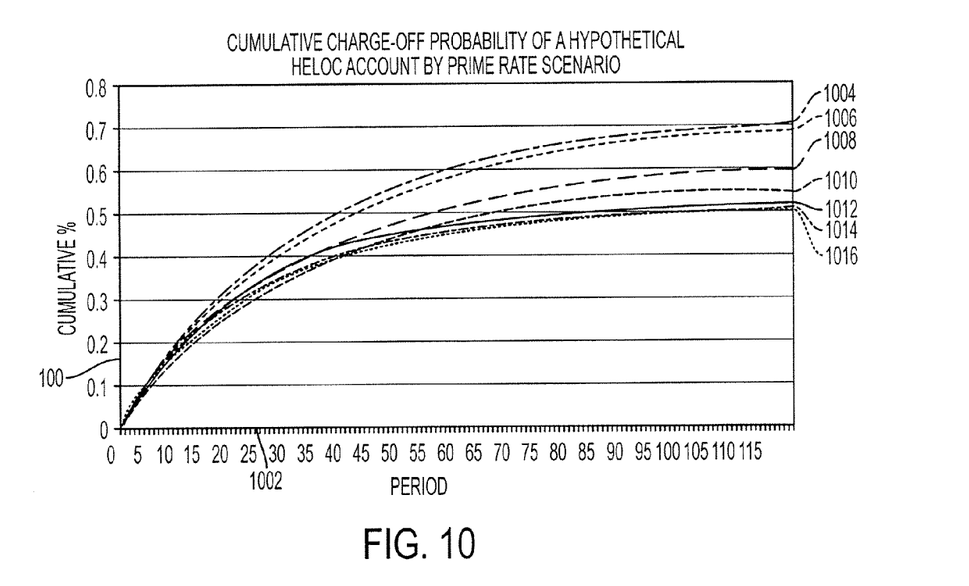
FIG. 10 shows the predicted cumulative charge off probability of an exemplary HELOC account with different prime rates according to an embodiment of the present invention.
Figure 11:
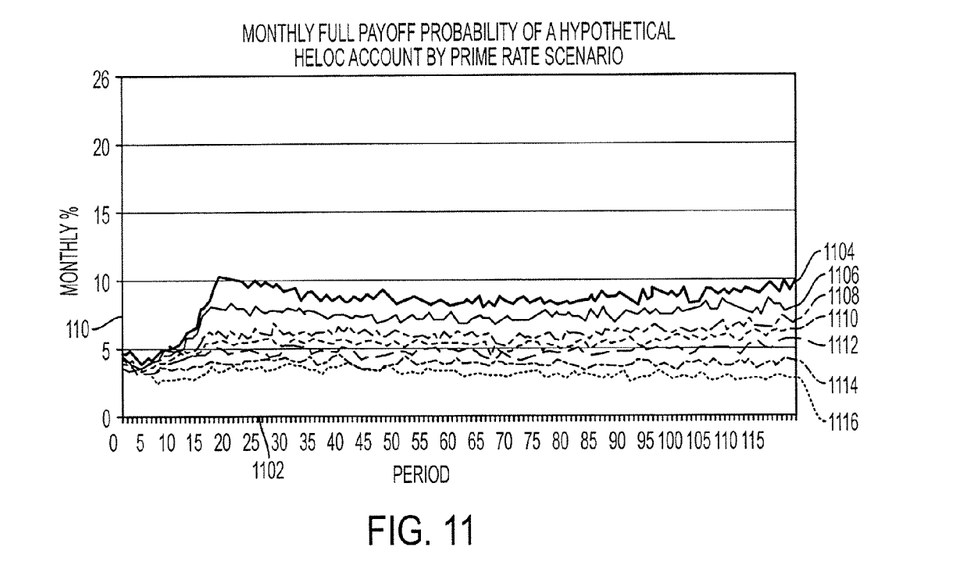
FIG. 11 shows the monthly full payoff probability of an exemplary HELOC account with different prime rates according to an embodiment of the present invention.
Figure 12:
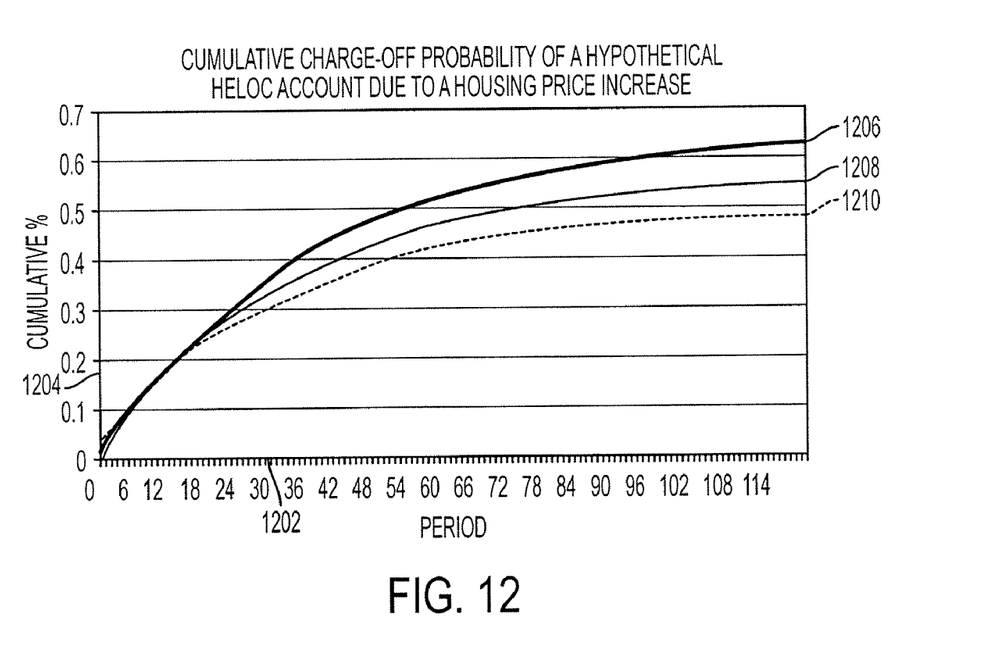
FIG. 12 shows the monthly charge off probabilities of a hypothetical HELOC account with different housing price indexes according to an embodiment of the present invention.

FIGS. 10-12 are plots showing the hypothetical effects of exogenous events on an exemplary HELOC account. This type of information is particularly useful for a lending institution to evaluate its risk exposure. FIGS. 10 and 11 show the effect a change in the prime lending rate would have on the charge off and payoff probabilities of a HELOC account. Once again, it is notable the charge off and payoff probabilities correspond to transitions to account states L 220 and P 212. It is also notable that the prediction periods along the X axes 1003, 1103 are 120 months. In FIG. 10, the cumulative distribution of charge offs is plotted along the Y axis 1004. In FIG. 11, the density of payoffs is plotted along the Y axis 1104. Each plot shows the effect of an interest rate change of 250 basis point upward 1004, 1104, a change of 150 basis point upward 1006, 1106, a change of 50 basis points upward 1008, 1108, no change 1010, 1110, a change of 50 basis points downward 1012, 1112, a change of 150 basis points downward 1014, 1114, and a change of 250 basis points downward 1016, 1116. These hypothetical scenarios provide lending institutions insight into their risk and profitability margins.

FIGS. 10-12 are plots showing the hypothetical effects of a housing price increase on a hypothetical HELOC account. The prediction period of 120 months is plotted along the X axis 1202 and the cumulative probability percentage is plotted along the Y axis 1204. The effect of no housing price increase 1206, a 10% increase 1208, and a 15% increase are shown. The plots confirm that an increase in housing prices decreases the probability of a HELOC charge off.

FIGS. 4-12 illustrate different ways of presenting data generated with the present invention. They are exemplary outputs 108 of the computational engine 102. Outputs 108 containing cumulative distribution functions, density functions, expected values, variances, skews and other statistics of each state variable, account parameter and data type are contemplated. Outputs 108 showing multiple random variable distributions and density functions as well as cross correlation, autocorrelation, and power spectral density statistics are also contemplated.

The various illustrative logical blocks and modules (e.g., the computational engine) described in connection with the examples disclosed herein may be implemented or performed in software, hardware, and combinations thereof with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A machine-readable medium comprising instructions for predicting outcomes of a home equity line of credit loan, wherein the instructions upon execution cause a machine to:
   receive a plurality of account characteristics for a home equity line of credit loan;
   generate an initial account state vector from the plurality of account characteristics;
   provide a plurality of account states, at least one account state representing a mutually exclusive duration of delinquency;
   generate a random number;
   update the initial account state vector by propagating a state vector forward to one of the plurality of account states using a statistical transition model and the random number;
   predict draw or payment events using the statistical transition model; and
   generate a probability distribution using the statistical transition model, the probability distribution related to at least one of a risk of default, a risk of delinquency, or a risk of prepayment.

2. The machine-readable medium of claim 1 wherein the plurality of account characteristics are selected from a group consisting of a location of a home, a loan origination date, a property value, an occupancy type, a junior ratio, a utilization at origination, a balance at origination, a term, a back end ratio, a prediction start date, an index rate, a margin, an interest rate, a home price index, and combinations thereof.

3. The machine-readable medium of claim 1 wherein the initial account state vector includes information that is used to determine at least one probability for each state transition.

4. The machine-readable medium of claim 1 further comprising instructions that upon execution cause a machine to receive a simulation parameter, wherein the simulation parameter is selected from a group consisting of a loan prediction period, a prediction interval, a number of Monte Carlo trials, and combinations thereof.

5. The machine-readable medium of claim 4 further comprising instructions that upon execution cause a machine to store an account state vector, the number of Monte Carlo trials, and the prediction interval.

6. The machine-readable medium of claim 5 further comprising instructions that upon execution cause a machine to store the initial account state vector as the account state vector, a 1 for the number of Monte Carlo trials, and a 0 for the prediction interval if no account state vector, trial number and prediction interval exist.

7. The machine-readable medium of claim 1 wherein the statistical transition model includes equations and coefficients to determine transition probabilities based on the information in the account state vector.

8. A computer-based method for predicting outcomes of a home equity line of credit loan comprising:
   receiving, at a computer, a plurality of account characteristics for a home equity line of credit loan;
   generating, by the computer, an initial account state vector from the plurality of account characteristics;
   providing, at the computer, a plurality of account states, at least one account state representing a mutually exclusive duration of delinquency;
   updating, at the computer, the initial account state vector by propagating a state vector forward to one of the plurality of account states using a statistical transition model and a random number that simulates the effect of a lapse of time on the initial account state vector;
   predicting, by the computer, draw or payment events using the statistical transition model; and
   generating, by the computer, a probability distribution using the statistical transition model, the probability distribution related to at least one of a risk of default, a risk of delinquency, or a risk of prepayment.

9. The method of claim 8 wherein the plurality of account characteristics are selected from a group consisting of a location of a home, a loan origination date, a property value, an occupancy type, a junior ratio, a utilization at origination, a balance at origination, a term, a back end ratio, a prediction start date, an index rate, a margin, an interest rate, a home price index, and combinations thereof.

10. The method of claim 8 wherein the initial account state vector includes information that is used to determine at least one probability for each state transition.

11. The method of claim 8 further comprising receiving, at the computer, a simulation parameter, wherein the simulation parameter is selected from a group consisting of a loan prediction period, a prediction interval, a number of Monte Carlo trials, and combinations thereof.

12. The method of claim 11 further comprising storing, at the computer, an account state vector, the number of Monte Carlo trials, and the prediction interval.

13. The method of claim 12 further comprising storing, at the computer, the initial account state vector as the account state vector, a 1 for the number of Monte Carlo trials, and a 0 for the prediction interval if no account state vector, trial number and prediction interval exist.

14. The method of claim 8 wherein the statistical transition model includes equations and coefficients to determine transition probabilities based on the information in the account state vector.

15. The machine-readable medium of claim 1 wherein the propagation of the state vector forward to one of the plurality of account states represents an event selected from a group of possible events, wherein one of the possible events represents a draw on a home equity line of credit.

* * * * *